No. 616,582. Patented Dec. 27, 1898.
V. ODQUIST & J. C. FYFE.
PHOTOGRAPHIC SHUTTER.
(Application filed Feb. 14, 1898.)
(No Model.)
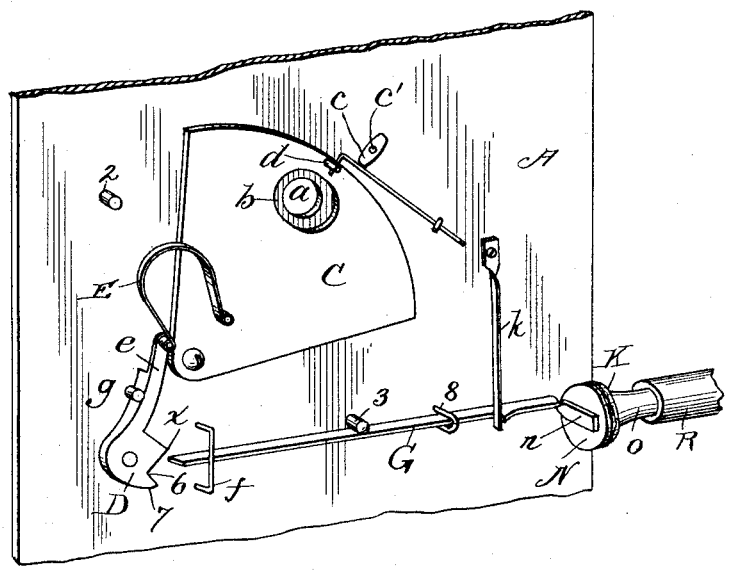
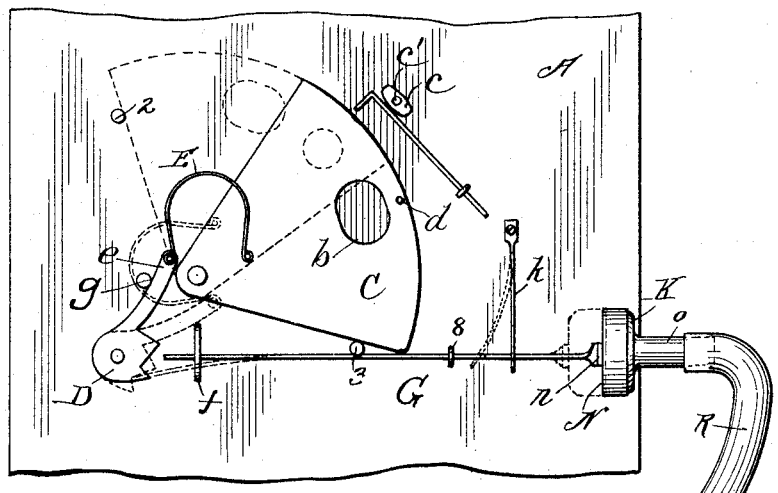
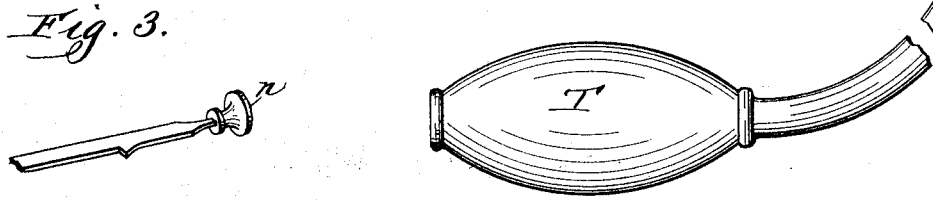
Witnesses:
Inventors:
Victor Odquist &
John C. Fyfe
By Frank D. Thomason,
Atty.

UNITED STATES PATENT OFFICE.

VICTOR ODQUIST AND JOHN C. FYFE, OF CHICAGO, ILLINOIS, ASSIGNORS TO THE WESTERN CAMERA MANUFACTURING COMPANY, OF SAME PLACE.

PHOTOGRAPHIC SHUTTER.

SPECIFICATION forming part of Letters Patent No. 616,582, dated December 27, 1898.

Application filed February 14, 1898. Serial No. 670,203. (No model.)

*To all whom it may concern:*

Be it known that we, VICTOR ODQUIST and JOHN C. FYFE, citizens of the United States, and residents of Chicago, Cook county, Illinois, have invented certain new and valuable Improvements in Photographic Shutters, of which the following is a full, clear, and exact description, reference being had to the accompanying drawings, and to the letters and figures of reference marked thereon.

The object of our invention is to provide a simple and cheap shutter for the lens of cameras which can be readily adjusted for either "time" or "instantaneous" exposures, which under all circumstances requires but one movement of the actuating-pawl to both set and shoot the shutter, and which can either be operated by the direct application of finger-pressure or pneumatically. This we accomplish by the mechanism hereinafter fully described, and pointed out in the claims.

In the drawings, Figure 1 is a perspective view of the rear of the front board of a camera, showing our invention applied thereto. Fig. 2 shows a rear elevation thereof. Fig. 3 shows in detail the broken-off end of the actuating-pawl.

In the drawings, A represents the lens-holding board of a camera, which is generally removably attached to the front of the camera apparatus and is provided with a lens-opening $a$. Pivoted to the rear of this board by a suitable screw or pin or equivalent device passing through it near its focal angle is a sheet-metal sector-shaped shutter C of such dimensions that its contours almost describe a quadrant. This shutter is provided with a suitable exposure-opening $b$ near the center of length of its curved edge, and its pivoted point is preferably so located as to be intersected by an imaginary line passing diametrically through the lens-opening $a$ at an angle of forty-five degrees and so that when said shutter is moved said exposure-opening will aline with and open said lens for a greater or less period of time, as will hereinafter fully appear.

Shutter C travels to the extent of its maximum movement when it is desired to make an instantaneous exposure and travels but one-half this distance when making a time exposure. Its greatest movement is limited by the two stop-pins 2 and 3, which are respectively located at corresponding distances from the center of the lens $a$, the one below and the other to the left of the same, as shown. We turn an oblong cam $c$ so that its length will aline with a transverse plane intersecting the lens-opening and so that it presses the free end of a spring-dog 9 toward said shutter. The shaft of this dog is disposed in a tangential plane to the curved edge of the shutter, and its free end portion, which is turned substantially at right angles to its body, is adapted to anticipate the outwardly-turned lug $d$, projecting from the center of length of the curved edge of the shutter at such point that whether the said shutter is moving in the one direction or the other it will stop at the center of maximum movement and open the lens. This cam $c$ is secured to the inner end of a spindle $c'$, which is journaled in the board A and has its outer end provided with suitable means with which the operator may intelligently turn it, as desired.

Pivotally secured to the shutter at a suitable point near its center of movement and in alinement with said pivotal center and the center of opening $b$ is one end of a U-shaped spring E. The other end of this spring is pivotally secured to the extremity of the longer arm $e$ of a cam D, which latter is suitably journaled at a point below the plane of the said shutter at a point intersected by an imaginary line intersecting the center of the lens $a$ and pivot of the shutter.

The movement of cam D when moving in one direction is limited by a stop-pin $g$ and when moving in the opposite direction is limited by a staple, hereinafter described, or by other suitable means. The side edge of this cam nearest the vertical plane of lens $a$ is provided with two straight planes arranged substantially at right angles to each other, so that the angle $x$, where they meet, will, when the shutter is set for a time exposure, as shown in Fig. 1, be intersected by a horizontal plane coming slightly above the center of the cam. The straight portion of this edge located above the angle $x$ terminates in a shoulder made by the base of arm $e$, and the straight portion of the edge below said angle terminates in a shoulder 6, made by providing said cam with the projection 7.

Engaging the straight portions of the edge of cam D is a longitudinally-reciprocal pawl G, which consists, preferably, of a straight strip of thin spring metal extending horizontally from a point near said cam to near the right-hand edge of the lens-board A, to which it is movably held by a guide-staple 8, located, preferably, about as shown, and a wider staple $f$, located near the cam D. Any suitable means, however, will answer for this purpose. The staple $f$ permits the adjacent end portion of the pawl to bend the necessary distance upward or downward, while it prevents the horizontal displacement of said pawl, and at the same time its upper end limits the downward movement of arm $e$ of the cam, as shown. This pawl is kept at the limit of its throw away from the cam by a vertically-disposed leaf-spring $k$, the upper end of which is suitably secured to board A and the lower free end of which engages a shoulder $m$, projecting from the rear edge of said pawl.

The pawl may be operated by the operator simply by pressing his finger on the end of the same farthest from the cam. In this event the outer end $n$ of the pawl is extended sufficiently beyond the edge of the front board A and is bent laterally, so as to provide a suitable head for the finger of the operator to press upon, or may be provided with a knob $r$, as shown in Fig. 3. If it is desired to operate the shutter pneumatically, we provide a cup K, which is placed edgewise to the board A and has a rubber diaphragm N, covering its open end like the head of a drum right opposite and in contact with the laterally-turned contiguous end $n$ of the pawl, as shown in Figs. 1 and 2 of the drawings. This cup has a narrow stem or stub $o$ projecting outward from its closed end, and stretched over the outer end of this stub is a rubber tube R, which is of any suitable length and extends to and terminates in a rubber bulb T. By compressing this bulb the diaphragm or head N of the cup is puffed out against the contiguous end of the pawl and reciprocates the same in the same manner as if the finger of the operator was directly pressed thereon.

The operation of our invention is substantially as follows: When the pawl is pushed toward the cam, its extremity comes in contact with either one of the straight edges on either side of angles $x$ thereof. It will never strike on said angle, because in none of the positions at which said cam stops will the angle be in alinement with the pawl. Say the pawl comes in contact with the straight edge below the angle $x$ of the cam. The elastic end of the same will travel along the said edge until it comes in contact with shoulder 6, whereupon it moves said cam to the right, and, presuming the shutter is in the position shown in Fig. 2, compresses the U-spring, and the tension of this spring causes the shutter to move to the opposite limit of its movement, as shown in dotted line in said Fig. 2. The actuating pressure being removed from the pawl, it automatically returns to its original position, and when it is desired to make the next exposure the pawl is moved longitudinally toward the cam again; but this time the end of the pawl will come in contact with the straight edge of the cam above angle $x$ and sliding along the same will engage the shoulder at the base of the arm $e$ thereof and move and restore said cam to its first-described position.

The operation of the U-shaped spring is the same whether the shutter is moved in one direction or the other and whether the shutter moves its maximum distance to make an instantaneous exposure or travels but half that distance, as when making a time exposure; and it is here desired to call attention to the important fact that when making instantaneous exposures each actuating movement or thrust of the pawl both "shoots" the shutter to make the exposure and simultaneously "sets" the shutter for the next exposure no matter in what direction the shutter is moved, and it will also be observed that one actuating thrust of this same pawl, when the shutter is limited to one-half its maximum movement, opens the lens for a time exposure and that the next thrust thereof closes said lens and sets the shutter for the next exposure.

The operation of the pawl and cam is just the same as hereinbefore described when it is desired to make a time exposure.

What we claim as new is—

1. A shutter for the lens of cameras having a segmental movement, and provided with an exposure-opening therein, in combination with a U-shaped spring, a cam, and devices for intermittently moving said cam; said U-shaped spring having one end connected to said shutter and the other to said cam, as set forth.

2. The combination with the front board of a camera having a lens-opening therein, a shutter having a segmental movement, and provided with an exposure-opening, devices for occasionally limiting said shutter to one-half its maximum movement, of a U-shaped spring, a cam and devices for intermittently moving said cam; said U-shaped spring having one end pivotally connected to said shutter and the other to said cam, as set forth.

3. The combination with a shutter for cameras having a segmental movement, a cam having one side edge provided with two converging straight planes arranged at a suitable angle to each other and devices for imparting the motion of said cam to said shutter, of a longitudinally-reciprocal pawl arranged in about the same horizontal plane as the center of said cam, and adapted to engage the edge of the same first on one side and then the other side of the vertex of said converging planes, as set forth.

4. The combination with a shutter for cameras having a segmental movement, a cam having one side edge provided with two converging straight planes arranged at a suitable angle to each other and devices for imparting the motion of said cam to said shutter, of an automatically-returnable longitudinally-reciprocal pawl arranged in about the same horizontal plane as the center of said cam and adapted to engage the edge of the same first on one side and then the other side of the vertex of said converging straight edges, as set forth.

5. A shutter for the lens of cameras having a segmental movement and provided with an exposure-opening, a cam having one side edge provided with two converging straight planes arranged at a suitable angle to each other, and a U-shaped spring connecting said cam and shutter, of a longitudinally-reciprocal pawl arranged in about the same horizontal plane as the center of said cam and adapted to engage the edge of the same first on one side and then the other side of the vertex of said converging portions of the cam, as set forth.

VICTOR ODQUIST.
JOHN C. FYFE.

Witnesses:
 SUSIE C. REID,
 FRANK D. THOMASON.